United States Patent
Park et al.

(10) Patent No.: US 9,247,546 B2
(45) Date of Patent: Jan. 26, 2016

(54) ALLOCATION OF RESOURCES FOR DEVICE-TO-DEVICE (D2D) COMMUNICATION AND METHOD AND APPARATUS FOR TRANSMITTING AND RECEIVING SIGNAL ON THE BASIS OF THE RESOURCE ALLOCATION

(71) Applicant: LG Electronics Inc., Seoul (KR)

(72) Inventors: Hanjun Park, Seoul (KR); Kijun Kim, Seoul (KR); Hyunho Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/711,321

(22) Filed: May 13, 2015

(65) Prior Publication Data
US 2015/0334698 A1    Nov. 19, 2015

Related U.S. Application Data

(60) Provisional application No. 61/992,872, filed on May 13, 2014.

(51) Int. Cl.
| | |
|---|---|
| *H04M 3/00* | (2006.01) |
| *H04W 72/04* | (2009.01) |
| *H04W 72/12* | (2009.01) |
| *H04W 4/08* | (2009.01) |
| *H04W 88/06* | (2009.01) |

(52) U.S. Cl.
CPC .............. *H04W 72/048* (2013.01); *H04W 4/08* (2013.01); *H04W 72/121* (2013.01); *H04W 88/06* (2013.01)

(58) Field of Classification Search
CPC ... H04W 72/048; H04W 72/121; H04W 4/08; H04W 88/06

USPC .............................. 455/518, 519, 520, 550.1
See application file for complete search history.

(56) References Cited

U.S. PATENT DOCUMENTS

| | | | | |
|---|---|---|---|---|
| 2015/0103789 A1* | 4/2015 | Tanaka | ................ | H04W 76/023 370/329 |
| 2015/0215981 A1* | 7/2015 | Patil | .................... | H04W 76/023 370/329 |

\* cited by examiner

*Primary Examiner* — Khai M Nguyen
(74) *Attorney, Agent, or Firm* — Birch, Stewart, Kolasch & Birch, LLP

(57) ABSTRACT

Allocation of resources for Device-to-Device (D2D) communication and a method and apparatus for transmitting and receiving a signal on the basis of the resource allocation are disclosed. A method for performing D2D (Device to Device) communication in a wireless communication system by a terminal includes: obtaining information related to an SA (Scheduling Assignment) resource region comprised of at least two sub scheduling assignment (SA) resource regions for the D2D communication; determining information regarding a terminal group to be operated in a reception mode in each sub SA resource region according to the information related to an SA resource region; determining a terminal group scheduled to include the terminal therein; and receiving a scheduling assignment (SA) for the D2D communication in the sub SA resource region in which the determined terminal group is scheduled to operate in the reception mode. The information related to an SA resource region includes the number (M) of sub SA resource regions included in the SA resource region and the number ($N_R$) of sub SA resource regions to be operated in a reception mode given to one terminal group within the SA resource region.

10 Claims, 9 Drawing Sheets

ALLOCATION OF RESOURCES FOR DEVICE-TO-DEVICE (D2D) COMMUNICATION AND METHOD AND APPARATUS FOR TRANSMITTING AND RECEIVING SIGNAL ON THE BASIS OF THE RESOURCE ALLOCATION

This application claims the benefit of U.S. Provisional Application No. 61/992,872, filed on May 13, 2014, which is hereby incorporated by reference as if fully set forth herein.

BACKGROUND OF THE INVENTION

1. Field of the Invention

The present invention relates to a wireless communication system, and more particularly to allocation of resources for Device-to-Device (D2D) communication and a method and apparatus for transmitting and receiving a signal on the basis of the resource allocation.

2. Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to allocation of resources for D2D communication and a method and apparatus for transmitting and receiving a signal on the basis of the resource allocation that substantially obviate one or more problems due to limitations and disadvantages of the related art.

It is to be understood that technical objects to be achieved by the present invention are not limited to the aforementioned technical objects and other technical objects which are not mentioned herein will be apparent from the following description to one of ordinary skill in the art to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing D2D (Device to Device) communication in a wireless communication system by a terminal includes: obtaining information related to an SA (Scheduling Assignment) resource region comprised of at least two sub scheduling assignment (SA) resource regions for the D2D communication; determining information regarding a terminal group to be operated in a reception mode in each sub SA resource region according to the information related to an SA resource region; determining a terminal group which the terminal belongs to; and receiving a scheduling assignment (SA) for the D2D communication in the sub SA resource region in which the determined terminal group is scheduled to operate in the reception mode, wherein the information related to an SA resource region includes the number (M) of sub SA resource regions included in the SA resource region and the number ($N_R$) of sub SA resource regions to be operated in a reception mode given to one terminal group within the SA resource region.

Additionally or alternatively, the information regarding the terminal group to be operated in the reception mode within the at least two sub SA resource regions may include the number ($N_1$) of terminal groups participating in the D2D communication in the SA resource region and the number ($N_2$) of terminal groups to be operated in the reception mode in each sub SA resource region.

Additionally or alternatively, the information regarding the terminal group to be operated in the reception mode within the at least two sub SA resource regions may include the number ($N_3$) of sub SA resource regions corresponding to a minimum period in which each of all terminal groups participating in the D2D communication in the SA resource region has one sub SA resource region to be operated in the reception mode.

Additionally or alternatively, the terminal group which the terminal belongs to may be determined by an index of a first subframe to which the scheduling assignment (SA) is transmitted, a random seed for terminal group decision, and an identifier (ID) of the terminal.

Additionally or alternatively, the terminal group to which the terminal belongs may be changed per sub SA resource region.

Additionally or alternatively, when the terminal wishes to transmit the SA to a peer terminal which belongs to a first terminal group to which the terminal belongs may include: changing a terminal group to which the terminal belongs from a first terminal group to a second terminal group; and transmitting the SA to the peer terminal in a sub SA resource region in which the first terminal group is scheduled to operate in the reception mode and the second terminal group is scheduled to operate in the reception mode, from among the SA resource regions.

Additionally or alternatively, the method may further include: informing each terminal group of changing from the first terminal group to the second terminal group through broadcasting.

Additionally or alternatively, the method may further include: receiving data corresponding to the received SA in a sub data resource region of a data resource region corresponding to a sub SA resource region in which the determined terminal group is scheduled to operate in a reception mode.

Additionally or alternatively, data corresponding to the SA transmitted in an n-th time resource region of the SA resource region may be transmitted in a k-th time resource region of data resource region satisfying n=k mod M or $$n = k + N_3 \cdot \left(\left\lceil \frac{k}{M} \right\rceil - 1\right) \mod M,$$

wherein $N_3$ is the number of sub SA resource regions corresponding to a minimum period in which each of all terminal groups participating in the D2D communication in the SA resource region has one sub SA resource region to be operated in the reception mode.

In accordance with another aspect of the present invention, a terminal for D2D (Device to Device) communication in a wireless communication system includes: a radio frequency (RF) unit; and a processor configured to control the RF unit, wherein the processor obtains information related to an SA (Scheduling Assignment) resource region comprised of at least two sub scheduling assignment (SA) resource regions for the D2D communication, determines information regarding a terminal group to be operated in a reception mode in each sub SA resource region according to the information related to an SA resource region, determines a terminal group to which the terminal belongs, and receives a scheduling assignment (SA) for the D2D communication in the sub SA resource region in which the determined terminal group is scheduled to operate in the reception mode, wherein the information related to an SA resource region includes the number (M) of sub SA resource regions included in the SA resource region and the number ($N_R$) of sub SA resource regions to be operated in a reception mode given to one terminal group within the SA resource region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

DESCRIPTION OF SPECIFIC EMBODIMENTS

Figure 1:
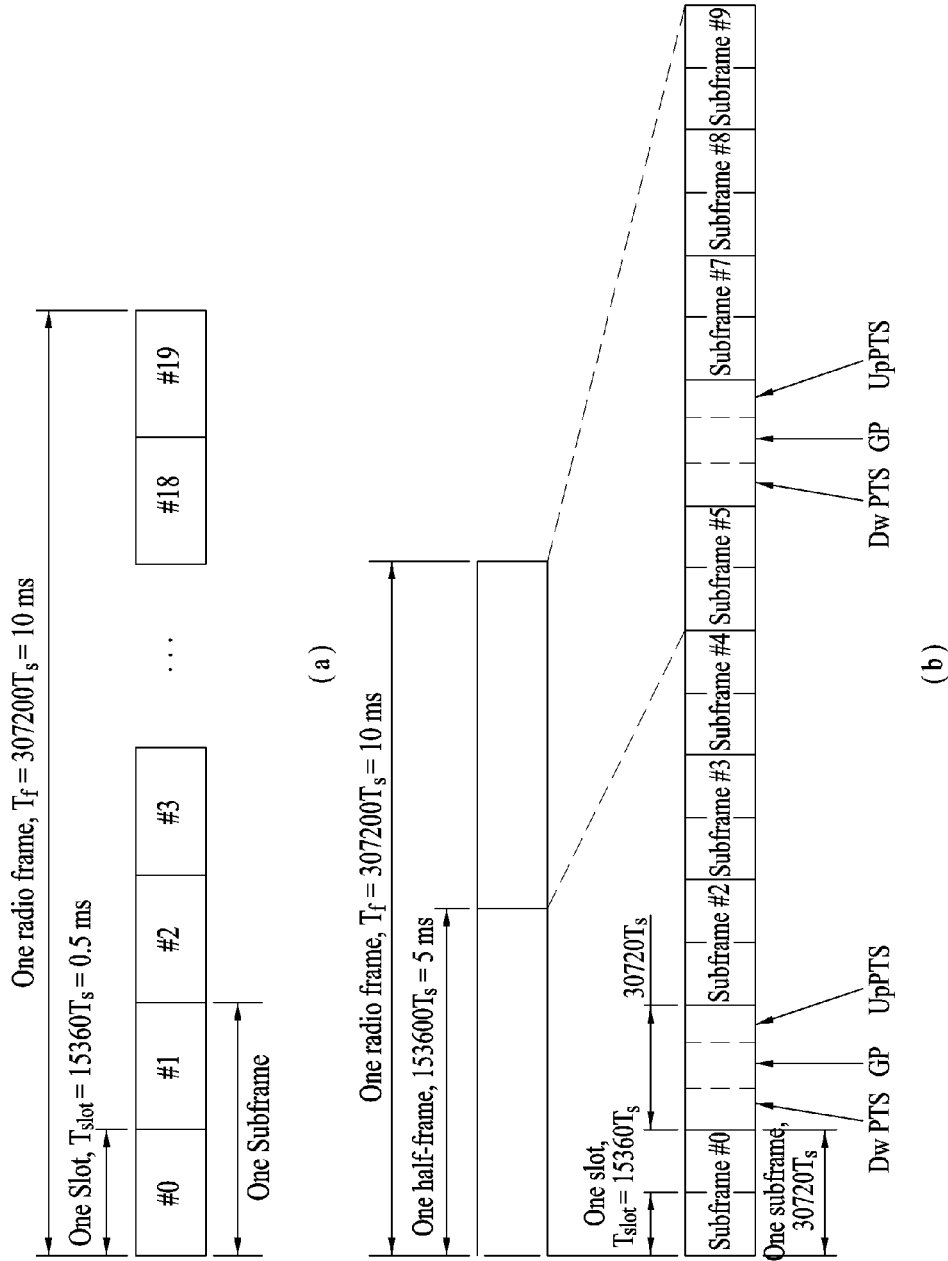
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | | Normal cyclic prefix in downlink | | | Extended cyclic prefix in downlink | |
| --- | --- | --- | --- | --- | --- | --- |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | | |
| 5 | $6592 \cdot T_S$ | $4384 \cdot T_S$ | $5120 \cdot T_S$ | $20480 \cdot T_S$ | $4384 \cdot T_S$ | $5120 \cdot T_S$ |
| 6 | $19760 \cdot T_S$ | | | $23040 \cdot T_S$ | | |
| 7 | $21952 \cdot T_S$ | | | $12800 \cdot T_S$ | | |
| 8 | $24144 \cdot T_S$ | | | — | — | — |
| 9 | $13168 \cdot T_S$ | | | — | — | — |

Referring to FIG. 1, a radio frame used in 3GPP LTE/LTE-A has a length of 10 ms (307200 Ts) and includes 10 subframes in equal size. The 10 subframes in the radio frame may be numbered, Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 2:
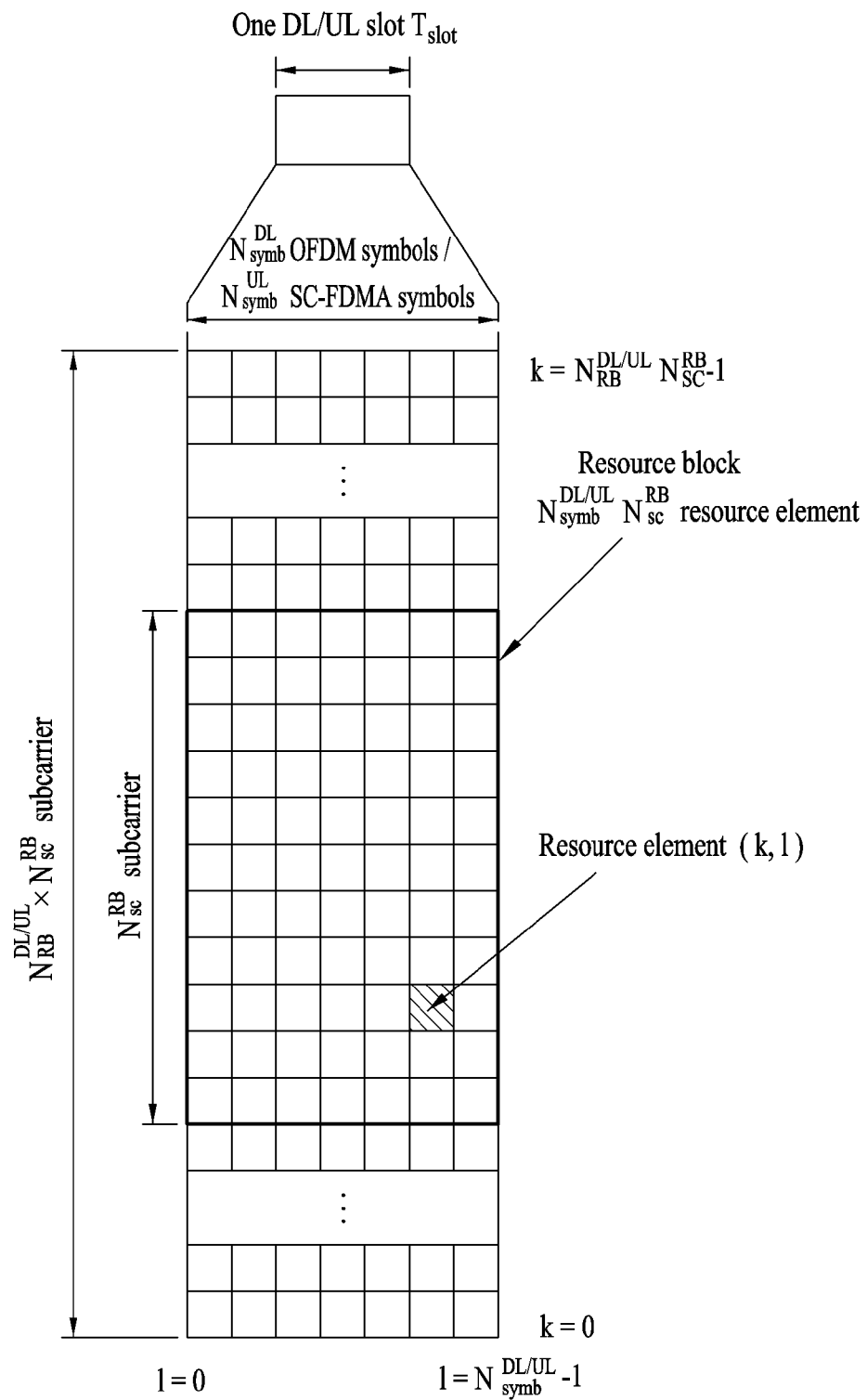
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
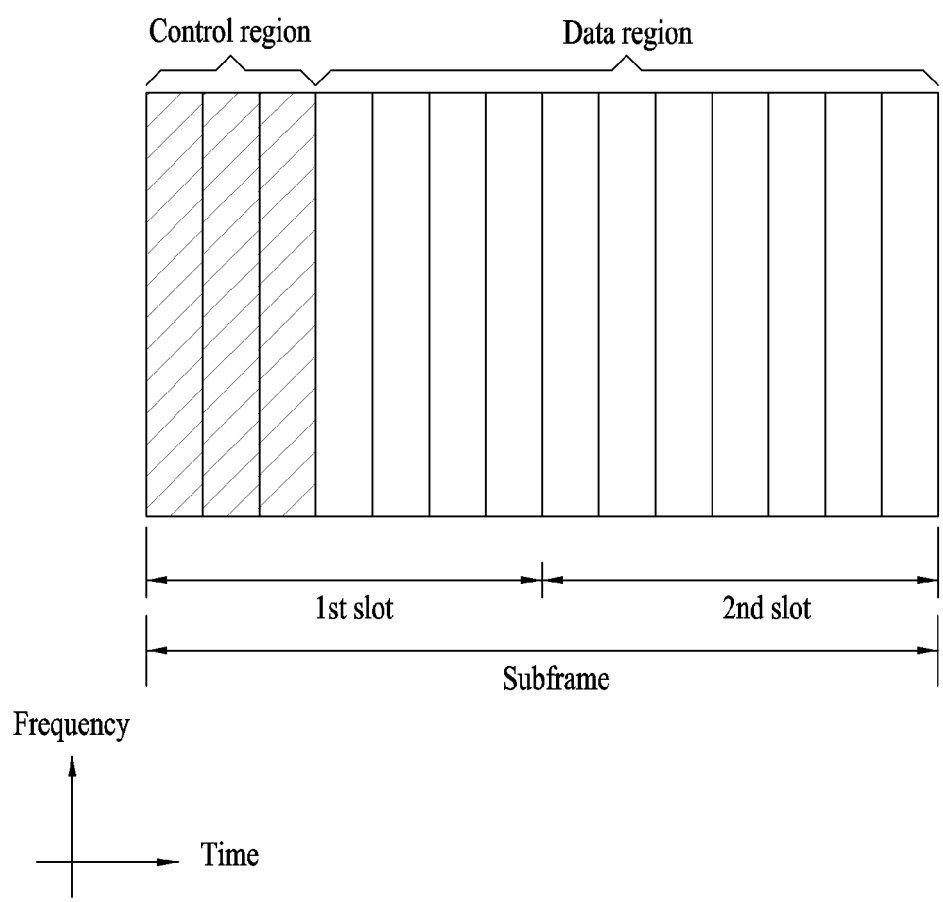
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
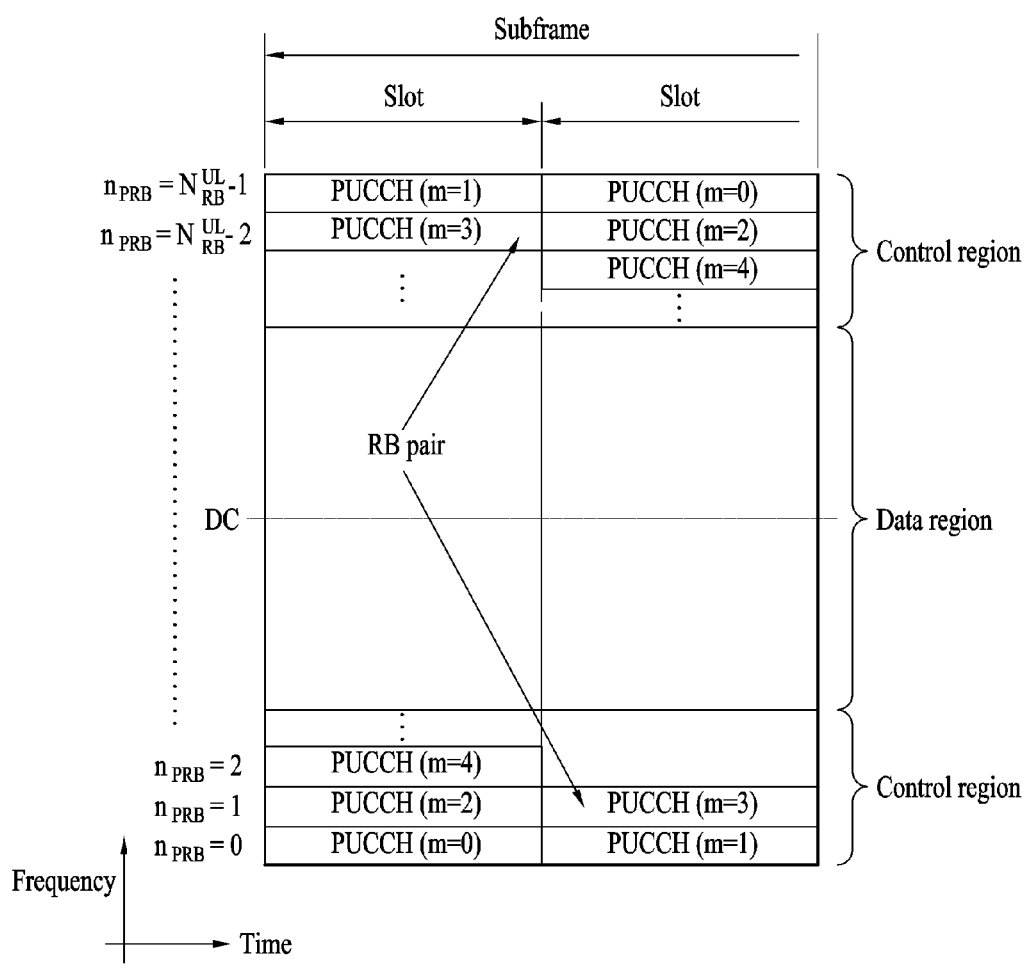
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency M during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Figure 5:
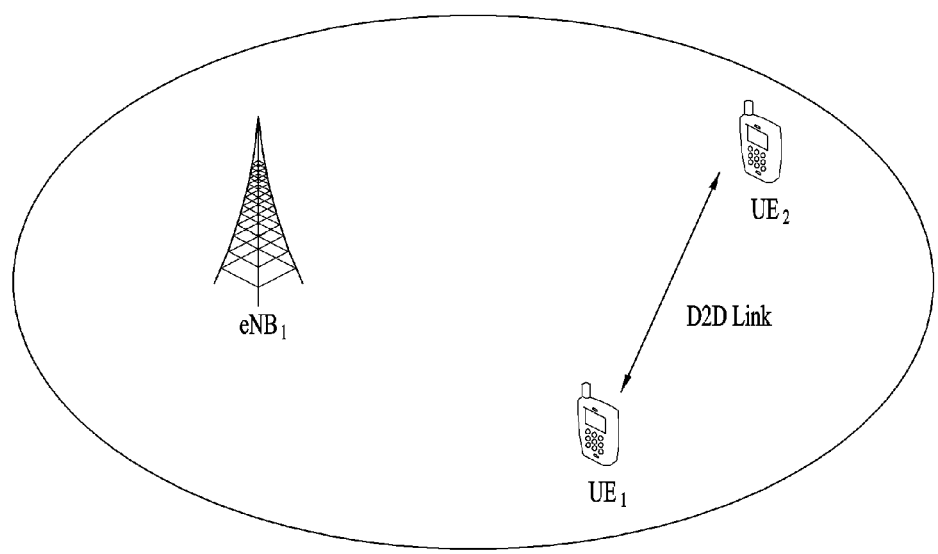
FIG. 5 exemplarily illustrates D2D UEs communicating with each other.

In an advanced wireless communication system such as LTE Rel. 12, UE to UE communication or general D2D (device to device) communication technique for transmitting and receiving data is discussed. The D2D communication can be operated in WAN (wireless access network) by a conventional cell (eNB (evolved-node B) or TP (transmission point)), therefore a scheme in which uplink (UL) band having less data traffic and less interference is utilized is discussed. FIG. 5 illustrates an exemplary D2D communication between UE1 and UE2.

In this case, D2D UE performs transmission and reception of data for D2D communication in an uplink (UL) band, so that it has half-duplex restriction in which it is impossible to simultaneously generate data transmission and reception.

Figure 6:
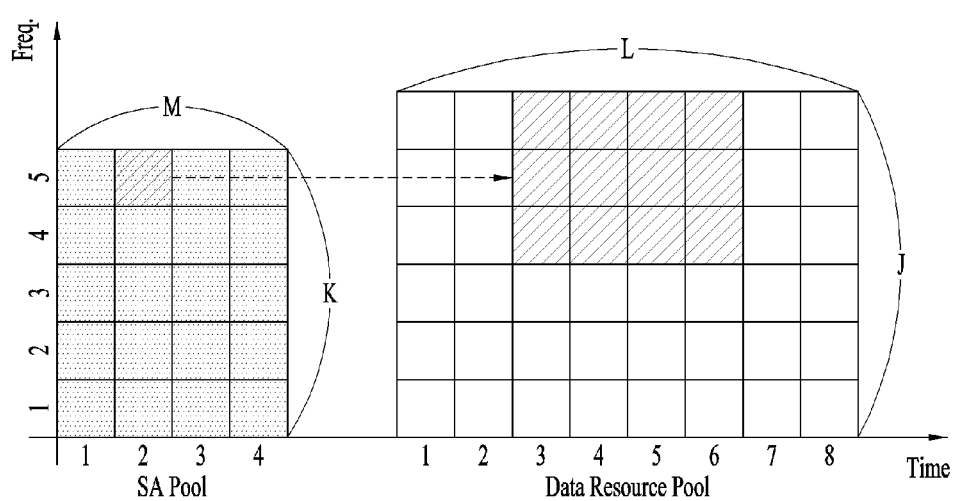
FIG. 6 illustrates scheduling assignment resource pool and data resource pool indicated by the scheduling assignment resource pool.

Meanwhile, in order to allocate data transmission resources for D2D wireless communication in the LTE Rel-12 system, a Scheduling Assignment (SA) resource pool and a data resource pool are configured, and SA transmitted in the SA resource pool schedules resources contained in the data resource pool. The SA may include resource allocation for use in time and frequency domains for D2D communication of D2D UE, MCS index, Tx/Rx UE ID, etc., and may indicate data scheduling for use in the data resource pool. That is, D2D UE may attempt to detect an SA in the SA resource pool. If D2D UE detects the SA scheduling data to be received by the SA, the D2D UE receives data from resources contained in the data resource pool indicated by the corresponding SA. FIG. 6 illustrates the SA resource pool composed of M subframes and K frequency resource units and the data resource pool composed of L subframes and J frequency resource units. In addition, FIG. 6 exemplarily illustrates a method for allowing the SA to schedule data.

In brief, a method for arbitrarily allocating resources within a resource pool may be used as a method for allocating resources within the SA resource pool and the data resource pool. However, D2D UE is unable to simultaneously transmit and receive data due to the half-duplex restriction. When data transmission and reception for a specific D2D UE are simultaneously generated in a specific subframe according to the arbitrary resource allocation method, the UE may transmit or receive data, so that resource allocation and data transmission may be inefficiently generated. For example, it is assumed that the SA resource pool includes a total of 4 subframes as shown in FIG. 7.

Figure 7:
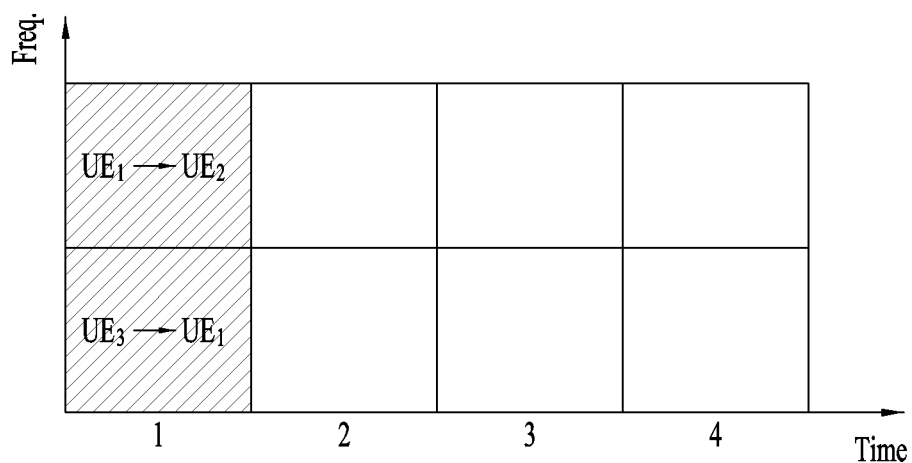
FIG. 7 exemplarily illustrates scheduling assignment resource pool.

In this case, in a first subframe as shown in FIG. 7, if $UE_1$ transmits data to $UE_2$ and $UE_3$ transmits data to $UE_1$, $UE_1$ is unable to simultaneously transmit and receive data due to the half-duplex characteristics, so that data of $UE_2$ is transmitted and $UE_3$ is unable to receive data to be transmitted to $UE_3$. Due to the above-mentioned half-duplex problem, when D2D UE desires to perform unicast transmission for specific UEs, a method for allowing UEs to be used for data transmission to recognize the position of subframes to be received may be preferable. That is, if the reception location at which UEs are scheduled to receive data according to the predefined scheme is determined, each UE used for data transmission transmits the SA or data to a subframe to be received by the corresponding UE on the basis of ID of a reception UE or the like, so that it is expected that the half-duplex problem can be mitigated.

Therefore, when a specific Rx UE that will be scheduled to receive dedicated data from D2D UE is present, D2D UE groups $(G_0, G_1, \ldots, G_{N1})$ are configured using ID information of D2D UE so as to prevent unnecessary data transmission caused by simultaneous data transmission/reception based on the half-duplex scheme, and a detailed description method for establishing the aggregate $R(m)=\{G_{k\_0(m)}, G_{k\_1(m)}, \ldots, G_{k\_N2(m)}\}$ composed of $N_2$ UE groups to be used as reception (Rx) targets at the m-th subframe is proposed.

In addition, after L subframes of the data resource pool are comprised of a total of M orthogonal data resource units, the m-th data resource unit is scheduled through the m-th SA. In this case, a method for indicating one of $$\left\lceil \frac{L}{2^k} \right\rceil$$

orthogonal resources using k bits contained in SA as specific interference resources for confirming the presence or absence of collision with other SAs will hereinafter be described in detail.

Although the embodiment has disclosed the preferred operations of the LTE system for convenience of description and better understanding of the present invention, the embodiment can be applied to an arbitrary wireless communication system configured to transmit data within a limited resource pool having the half-duplex characteristics.

Creation of D2D UE Group

First Method for Creating M UE Group Aggregates

In accordance with the embodiment, UE groups configured to perform the Rx operation per subframe on the condition that ($N_R$=2) reception opportunities are allocated to each UE group using (M=4) subframes is defined. The UE groups may be denoted by M aggregates ($S_1, S_2, \ldots, S_M$).

For this purpose, the following mathematical method can be used.

If ($N_R$=2) reception opportunities are allocated to each UE group in association with (M=4) subframes, a total of ($N_1 = {}_M C_{N_R} = 6$) reception opportunity combinations are defined. If each reception opportunity combination is allocated to only one UE group, a minimum of $N_1$ UE groups may have different reception opportunity combinations. In order to allocate the reception opportunity combinations to each of M subframes, M aggregates, each of which has ($N_2 = N_R * {}_M C_{N_R}/M = 3$) elements, are generated. A method for generating M aggregates represents elements of $N_1$ reception opportunity combination aggregates $\{1, 2, \ldots, N_1\}$ as a bit string of M bits, and the elements of $N_1$ reception opportunity combination aggregates $\{1, 2, \ldots, N_1\}$ are arranged in the order of their magnitudes. For example, ($N_1$=6) elements are arranged in the order of 0011→0101→0110→1001→1010→1100 according to their magnitudes.

Thereafter, if a specific position at which the i-th bit of the bit string is set to 1 is denoted by $k_1, k_2, \ldots, k_M$, the corresponding element is allocated to the M-th aggregate ($S_{K\_M}$). The number of bit strings, each of which is denoted by 1, is set to 2, so that the corresponding element is repeatedly allocated to 2 aggregates. For example, a third bit of 0011 is set to 1 and a fourth bit of 0011 is set to 1, so that the third bit and the fourth bit are respectively allocated to $S_3$ and $S_4$.

The above-mentioned example can be represented by the following table 5.

TABLE 5

| $S_1$ | $S_2$ | $S_3$ | $S_4$ |
|---|---|---|---|
| 4 | 2 | 1 | 1 |
| 5 | 3 | 3 | 2 |
| 6 | 6 | 5 | 4 |

That is, UE groups #4, #5, and #6 are allocated to a first subframe from among fourth subframes, UE groups #2, #3, and #6 are allocated to a second subframe, and UE groups are allocated to the remaining subframes as shown in Table 5.

The above-mentioned scheme is characterized in that the number of overlapped elements is reduced so that opportunities for transmitting data from one UE group to another UE group can be relatively uniformly assigned. In this case, for stability of SA transmission such as SA retransmission, $N_R$ may have 2 or higher.

Second Method for Generating M UE Group Aggregates

In accordance with a detailed embodiment, if $\{1, 2, \ldots, N_1\}$ elements are repeatedly used $N_R$ times and $N_3$ is denoted by $N_3 = M/N_R \geq N_R$, a method for generating M aggregates, each of which has $(N_2 \leq N_3+1)$ elements is proposed, and as such a detailed description thereof will hereinafter be described. For convenience of description and better understanding of the present invention, a method for allowing each column to generate ($N_2$ by M) matrices indicating one aggregate according to the embodiment will hereinafter be described in detail.

The $(i \in \{1, 2, \ldots, N_2\})$-th row of ($N_2$ by M) matrix (P) is comprised of $\{N_3*(i-1)+1, N_3*(i-1)+2, \ldots, N3*i\}$ elements.

Elements of the $(i \in \{1, 2, \ldots, N_2\})$-th row and the $(j \in \{1, 2, \ldots, M\})$-th column of ($N_2$ by M) matrix (P) are as follows.

$(P)_{ij} = N_3*(i-1)+j-N_3*(k-1)$ if $i=1, N_3*(k-1)+1 \leq j \leq N_3*k, k \in \{1,2,\ldots,N_R\}$ $(P)_{ij} = N_3*(i-1)+j$ if $i>1, 1 \leq j \leq N_3$ $(P)_{ij} = N_3*(i-1)+(j-N_3*(k-1)-1+(i-1)*(k-1) \bmod N_3)+1$ (cf. mod=modulo operation) if $i>1, N_3*(k-1)+1 \leq j \leq N_3*k, k \in \{2,3,\ldots,N_R\}$ In this case, the j-th column of the above matrix may indicate an index of a UE group to be used as a reception target of the j-th subframe. That is, assuming that the j-th column of the matrix (A) is denoted by $[A_{1,j}, A_{2,j} \ldots A_{N\_2,j}]$, this means that UE groups $\{G_{A\_1,j}, G_{A\_2,j}, G_{A\_N\_2,j}\}$ of the j-th subframe are used as the reception targets. In this case, UEs contained in one of the above groups at the j-th subframe are operated in the reception (Rx) mode.

The following table 6 may indicate M aggregates for the case ($N_1=4, N_R=2, M=4$) and the other case ($N_1=16, N_R=2, M=8$).

TABLE 6

| $S_1$ | $S_2$ | $S_3$ | $S_4$ |
|---|---|---|---|
| 1 | 2 | 1 | 2 |
| 3 | 4 | 4 | 3 |

TABLE 7

| $S_1$ | $S_2$ | $S_3$ | $S_4$ | $S_5$ | $S_6$ | $S_7$ | $S_8$ |
|---|---|---|---|---|---|---|---|
| 1 | 2 | 3 | 4 | 1 | 2 | 3 | 4 |
| 5 | 6 | 7 | 8 | 6 | 7 | 8 | 5 |
| 9 | 10 | 11 | 12 | 11 | 12 | 9 | 10 |
| 13 | 14 | 15 | 16 | 16 | 13 | 14 | 15 |

A difference between the first method and the second method is that each of $N_1$ UE groups for use in the second method has one Rx opportunity in units of $N_3$ subframes. In Table 6, each of UE groups ($G_1, G_2, G_3, G_4$) has one Rx opportunity at each of the first and second subframes, and each of UE groups ($G_1, G_2, G_3, G_4$) has one Rx opportunity at each of the third and fourth subframes. The above-mentioned characteristics have advantages in that, when the SA retransmission request or the like is performed for a UE of another group during SA transmission between the same UE groups to be described later, only the first Rx opportunity from among the UE's Rx opportunities is discarded and the remaining Rx opportunities can be guaranteed.

Method for Deciding $N_1$ and $N_2$ of M Subframes of SA Resource Pool

In accordance with a detailed embodiment of the present invention, assuming that the number of subframes of the SA resource poll of D2D UE is M, $N_R$ (where, $N_R$ ($\geq 2$)) per D2D UE group is a divisor of M, and $\{(NR)2 \leq M\}$ Rx opportunities are allowed, a method for establishing the aggregate R(m)= $\{G_{k\_0(m)}, G_{k\_1(m)}, \ldots, G_{k\_N2(m)}\}$ composed of a total of $N_1$ UE groups and $N_2$ UE groups to be used as Rx targets at the m-th subframe contained in the SA resource pool will hereinafter be described in detail. Assuming that the number of D2D UEs contained in each group of a total of $N_1$ UE groups is relatively uniform, the index aggregate $\{k\_0(m), k\_1(m), \ldots, k\_N2(m)\}$ indicating elements of R(m) may be designed in such a manner that a small number of overlapped elements may be present in association with different values (m1, m2). That is, one element or UE group must have the Rx opportunities related to different UE groups at each of $N_R$ subframes each having the Rx opportunity. Assuming that Group $G_1$ and Group $G_2$ always have the Rx opportunity at the same subframe, Group $G_1$ and Group $G_2$ cannot communicate with each other due to the half-duplex characteristics of D2D UE, and this means that Group $G_1$ and Group $G_2$ have been unnecessarily distinguished from each other. Therefore, the present invention proposes a method for generating the index aggregate $\{k\_0(m), k\_1(m), \ldots, k\_N2(m)\}$ indicating elements of R(m) according to the first method and the second method. In this case, the first method is denoted by a combination for selecting $N_R$ subframes from among a total of M subframes, so that $N_1$ and $N_2$ are represented by the following equation 1 on the condition that the number of subframes of the SA resource pool is M and $N_R$ (where, $N_R$ is a divisor of M) reception (Rx) opportunities for each D2D UE group are given.

[Equation 1]
For given M, $N_R$ $$N_1 = {}_MC_{N_R} \tag{1}$$

$$N_2 = N_R * N_1 / M \tag{2}$$

Alternatively, assuming that R(m) is established according to the second method, $N_1$, $N_2$ and $N_3$ can be represented by the following equation 2.

[Equation 2]
For given M, $N_R (\leq M^2)$ $$N_3 = M/N_R \tag{1}$$

$$N_2 \leq N_3 + 1 \tag{2}$$

$$N_1 = N_2 * N_3 \tag{3}$$

Alternatively, if a maximum number of elements overlapped between two arbitrary aggregates from among M aggregates is set to 1 so as to relatively uniformly allocate the transmission (Tx) opportunities to other groups using the second method, $N_1$ and $N_2$ may be established as represented by the following equation 3.

[Equation 3]
For given M, $N_R (\leq M^2)$ $$N_3 = M/N_R \tag{1}$$

$N_2 = P+1$ ($P$ is a maximum positive number for satisfying the expression $\{(Q*k \bmod N_3 \neq 0$ for $1 \leq Q \leq P < N_3$ and $k=1, \ldots, N_R-1\}$ or $P$ is denoted by $P = <N_1/M>$ if $N_R$ is denoted by $N_R=1$) (2)

$$N_1 = N_2 * N_3 \tag{3}$$

Decision of D2D UE Group

A. In-Network Case

In accordance with the present invention, $N_1$ D2D UE groups are established and a method for establishing the aggregate R(m) of UE groups to be used as reception (Rx) targets at the m-th subframe in association with M subframes has high efficiency on the condition that D2D UEs evenly belong to $N_1$ groups at the corresponding SA transmission time point. It is assumed that the index aggregate of M groups is determined as shown in Table 6. In this case, assuming that all D2D UEs belong to Group $G_1$ and Group $G_3$, a second subframe is not used for SA transmission, resulting in a waste of resources. Briefly, D2D UE for use in the inter-network environment can receive a UE-specific configuration regarding the correct SA transmission position from its own serving cell through higher layer signaling. However, if the inter-network environment UE performs D2D communication with the out-network environment UE or if traffics of D2D UEs of the inter-network environment are dynamically generated and SA resources are changed to a UE-specific configuration, the above-mentioned operations may be considered inefficient in terms of resource utilization. Therefore, according to detailed embodiments, if D2D UE is in the inter-network environment in which D2D UE can receive configuration information from a specific cell, the cell (eNB or TP) informs the corresponding D2D UE of the aggregate R(m) of UE groups scheduled to receive the SA at the m-th subframe in association with M subframes contained in the SA resource pool, a random seed for generating the index of a group including the corresponding UE, and the value of $N_S$, and D2D UE may determine the index iG of the group including the D2D UE using $N_S$, $n_{ID}$ corresponding to UE ID, and the index $n_{SA}$ of a first subframe needed for SA transmission, as represented by the following equation 4.

$$iG = (n_{SA}+1)*(N_S+1)*n_{ID} \bmod N_1 \qquad \text{[Equation 4]}$$

$N_S$ may have a default value when there is no additional configuration. $N_S$ and $n_{SA}$ must be equally given to D2D UEs staying in the inter-network environment of a specific cell, so that an arbitrary UE can calculate a group including a UE scheduled to receive data from the arbitrary UE. That is, $N_S$ and $n_{SA}$ information may be cell-specifically signaled to D2D UEs. In Equation 4, it is assumed that $N_1$ is a predetermined value capable of being recognized by the arbitrary UE.

B. Out-Network Case

If D2D UE is in the out-network environment, the D2D UE is unable to receive a UE-specific configuration regarding the SA transmission position from a specific cell. However, ID information between D2D UEs is needed for wireless communication between D2D UEs, such that it is assumed that a minimum amount of UE ID information is guaranteed. Therefore, in case of the out-network environment according to the detailed embodiment, the random seed $N_S$ fixed to a default value is assumed, and the index of a group including the corresponding UE is selected using UE ID.

$$iG = n_{ID} \bmod N_1 \qquad \text{[Equation 5]}$$

In addition, assuming that the same subframe index between D2D UEs is given to the out-network through D2DSS (D2D synchronization signal), the corresponding UE may select the index iG of the UE group using the random seed ($N_S$) having a fixed value as shown in Equation 4.

Group Change According to Subframe

As an additional operation of the present invention, when the SA resource pool has a total of M subframes and the UE groups R(m) to be used as a reception target at the subframe (m) are configured, a specific UE may change a UE group including the specific UE per subframe according to the predetermined equation. For example, when the second method is used, a UE group at the subframe 1, 2, . . . , M−1) can be represented by the following equations 6 and 7.

$$iG = \left(n_{SA} + \left\lceil \frac{m}{N_3} \right\rceil\right) * (N_s+1) * n_{ID} \bmod N_1 \qquad \text{[Equation 6]}$$

$$iG = \left\lceil \frac{m}{N_3} \right\rceil \cdot n_{ID} \bmod N_1 \qquad \text{[Equation 7]}$$

For example, with reference to Table 6, $UE_1$ and $UE_2$ may belong to UE group $G_1$ at the first and second subframes, and $UE_1$ 과 $UE_2$ may belong to UE group $G_2$ at the third and fourth subframes. In this case, since $UE_1$ is not always contained in the same group, $UE_1$ may have at least one opportunity to transmit data to $UE_2$.

D2D Wireless Communication Between the Same UE Groups

A. SA Retransmission Request for UE of Another Group

In accordance with a detailed embodiment of the present invention, when the SA resource pool includes a total of M subframes and the UE groups R(m) to be used as the Rx targets at the m-th subframe are established according to the above-mentioned methods, if a specific UE desires to transmit the SA to a UE contained in the same group, a method for allowing the specific UE to transmit the SA through a UE contained in another group is proposed.

If D2D $UE_1$ belongs to the group Gi and desires to transmit $SA_1$ to another $UE_2$ contained in the same group Gi, $UE_1$ and $UE_2$ belong to the same group, so that $UE_1$ is unable to directly transmit $SA_1$ to $UE_2$ in so far as $UE_1$ does not discard its own reception opportunity.

Therefore, $UE_1$ transmits $SA_2$, that requests retransmission of $SA_1$ to be transmitted from $UE_1$, to $UE_3$ belonging to another group other than a subframe in which the group Gi of $UE_1$ corresponds to the reception target. Thereafter, $UE_3$ having received $SA_2$ may retransmit the corresponding $SA_1$ to $UE_2$ at a subframe in which Group Gi including $UE_1$ and $UE_2$ is used as the reception target.

Figure 8:
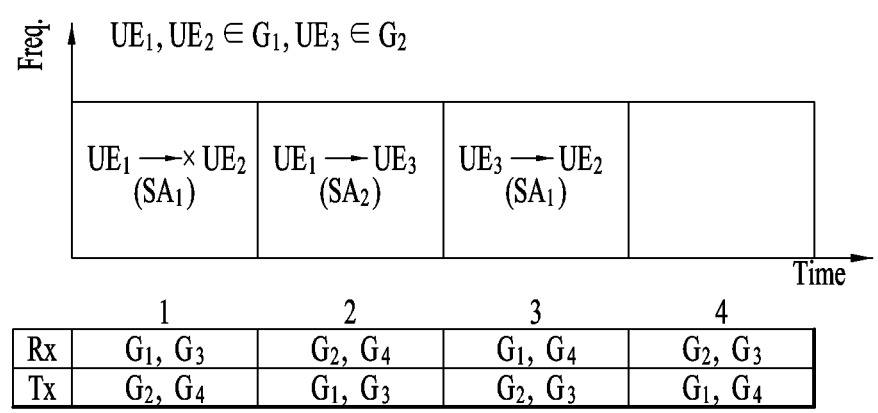
FIG. 8 illustrates UE groups having reception or transmission opportunity in each subframe included in scheduling assignment resource pool and operation of UEs in the UE groups.

For example, it is assumed that UE groups in which $R(1)=(G_1, G_3)$, $R(2)=(G_2, G_4)$, $R(3)=(G_1, G_4)$, and $R(4)=(G_2, G_3)$ are used as the reception targets are assigned to 4 subframes as shown in Table 6. In addition, $UE_1$ and $UE_2$ belong to Group $G_1$, and $UE_3$ belongs to Group $G_2$. As a result, $UE_1$ and $UE_2$ may have the reception opportunity at the first and third subframes, and $UE_3$ may have the reception opportunity at the second and fourth subframes. In this case, if $UE_1$ desires to transmit data to $UE_2$, $UE_1$ may transmit $SA_2$ requesting $SA_1$ retransmission for scheduling $UE_2$ data to $UE_3$ at the second subframe. After $UE_3$ receives $SA_2$, $UE_3$ retransmits $SA_1$ to $UE_2$ at the third subframe. The operations of the present invention are shown in FIG. 8.

The above-mentioned operations are associated with the second method in which a total of $N_1$ groups can equally obtain the reception opportunity at intervals of $N_3$, so that the above-mentioned operations can be effectively utilized.

B. Group Change and Transmission of Changed Content

In accordance with a detailed embodiment of the present invention, when the SA resource pool includes a total of M subframes and UE groups R(m) to be used as the reception targets at the subframe (m) according to the above-mentioned methods are configured, if D2D $UE_1$ are contained in Group Gi and desires to transmit $SA_1$ to $UE_2$ contained in the same group Gi, a group including D2D $UE_1$ is arbitrarily changed to Gj(i≠j), and the corresponding information may be broadcast at the first reception (Rx) time point per UE group.

In a specific case, a UE of another group scheduled to request retransmission according to the SA retransmission request scheme may not be present. Therefore, $UE_1$ scheduled to transmit the SA to another $UE_2$ of the same group changes its own group Gi to another group Gj, so that $UE_1$ can transmit SA to $UE_2$.

As can be seen from FIG. 8, it is assumed that $UE_1$ and $UE_2$ are present, $UE_1$ and $UE_2$ are contained in Group $G_1$, and $UE_1$ desires to transmit $SA_1$ for data scheduling to $UE_2$. In this case, since $UE_3$ scheduled to request SA retransmission is not present, it is impossible to perform the SA retransmission operation through a UE contained in another group.

Figure 9:
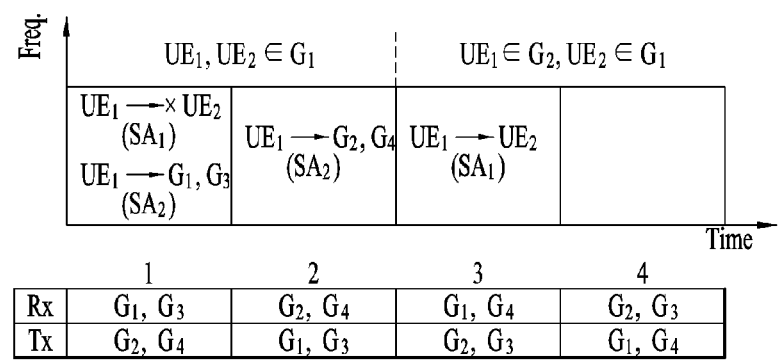
FIG. 9 exemplarily illustrates operation of a UE who desires to transmit the scheduling assignment to a peer UE in the same UE group.

Therefore, $UE_1$ may arbitrarily change its own group to one of $\{G_2, G_3, G_4\}$. For example, it is assumed that $UE_1$ changes its own group to Group $G_2$. In this case, $UE_1$ may transmit $SA_2$ including specific information indicating that $UE_1$ has changed its own group at a first reception time point of each group. FIG. 9 illustrates the above operations.

Cooperative Method with Resource Pattern (RPT)

A. Configuration of $R_D(l)$ for $R_{SA}(m)$-Based Data Resource Pool Regarding SA Resource Pool In accordance with a detailed embodiment of the present invention, the number of subframes of the SA resource pool is set to M, the number of subframes of the data resource pool is set to L, the aggregate $R_{SA}(m)$ of UE groups to be used as the reception targets for each of M subframes is calculated according to the above-mentioned methods, and the aggregate $R_D(l)$ of UE groups to be used as the reception targets per subframe contained in the data resource pool can be determined according to the following equation 8.

$$R_D(l) = R_{SA}(l \bmod M) \text{ for } l=0,1,2,\ldots,L-1 \quad \text{[Equation 8]}$$

Figure 10:
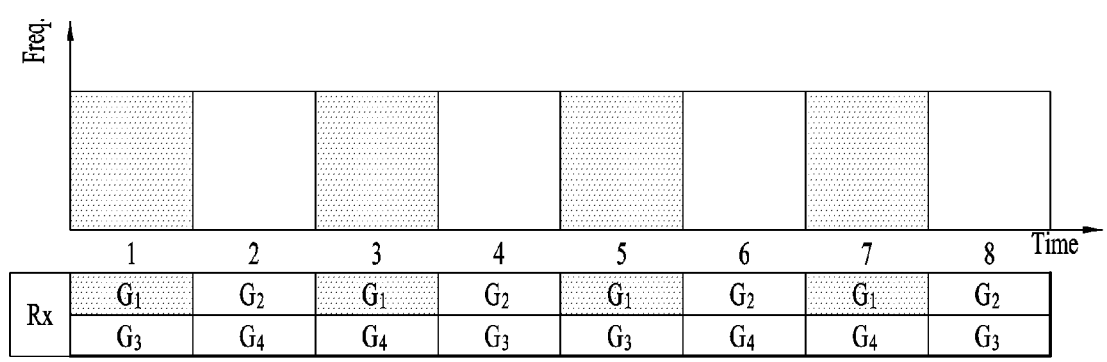
FIG. 10 exemplarily illustrates data resource pool assigned to UE groups in accordance with the scheduling assignment resource pool.

For example, it is assumed that the SA resource pool includes a total of (M=4) subframes and $\{k\_0(m), k\_1(m), \ldots, k\_N_2(m)\}$ is calculated as shown in Table 6. $R_D(l)$ of the data resource pool is shown in FIG. 10.

In this case, data of SA, that has been transmitted to Group Gi in the SA resource pool, may have the Tx opportunity in all subframes in which Group Gi is used as the Rx target within the data resource pool. That is, as shown in FIG. 10, SA having been transmitted for Group $G_1$ may have the data Tx opportunity at $1^{st}$, $3^{rd}$, $5^{th}$, and $7^{th}$ subframes contained in the data resource pool.

Figure 11:
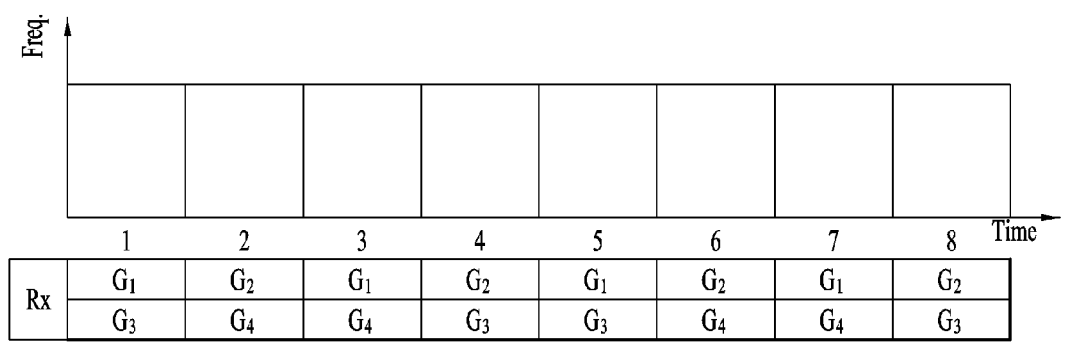
FIG. 11 exemplarily illustrates another data resource pool assigned to UE groups in accordance with the scheduling assignment resource pool.

Alternatively, data regarding the SA having been transmitted at the m-th subframe of the SA resource pool may have the Tx opportunity at all the l-th subframes contained in the data resource pool satisfying $\{(l \bmod M)=m\}$ according to Equation 8. Meanwhile, UE group allocation in the data resource group may be established to obtain a time diversity gain, as represented by the following equation 9 and FIG. 11

$$R_D(l) = R_{SA}\left(l + N_3 \cdot \left(\left\lceil \frac{l}{M} \right\rceil - 1\right) \bmod M\right) \quad \text{[Equation 9]}$$
$$\text{for } l = 0, 1, 2, \ldots, L-1$$

In this case, data of SA having been transmitted to Group Gi in the SA resource pool may have the Tx opportunity in all subframes in which Group Gi is used as the Rx target within the data resource pool, or may have the Tx opportunity at all the l-th subframes contained in the data resource pool satisfying $$l + N_3 \cdot \left(\left\lceil \frac{l}{M} \right\rceil - 1\right) \bmod M = m$$

according to Equation 9.

B. Allocation of Interference Measurement Resources Using RPT Bits Field

If the Rx group per subframe within the data resource pool is established according to the method for establishing $R_D(l)$ for the $R_{SA}(m)$-based data resource pool regarding the above-mentioned SA resource pool, UEs may not consider the half-duplex problem when transmitting data to UEs contained in different groups. However, if there is an SA configured to perform data scheduling for the same frequency resource and the same group, different data may collide with each other. Therefore, D2D UEs may determine the above-mentioned collision situation, and may correct the next SA transmission position.

For this purpose, according to the above-mentioned scheme, within the subframe aggregate contained in the data resource pool in which a group having a reception (Rx) UE to be used for SA data transmission is used as the Rx target, arbitrary data transmission may be needed. Therefore, according to a detailed embodiment of the present invention, when the Rx group per subframe is established in the data resource pool, the SA to be used for data scheduling for a specific group Gi may indicate the actual data transmission position within S subframes through B bits of the RPT field with respect to the S subframe aggregates in which Group Gi is used as the Rx group within the data resource pool.

Figure 12:
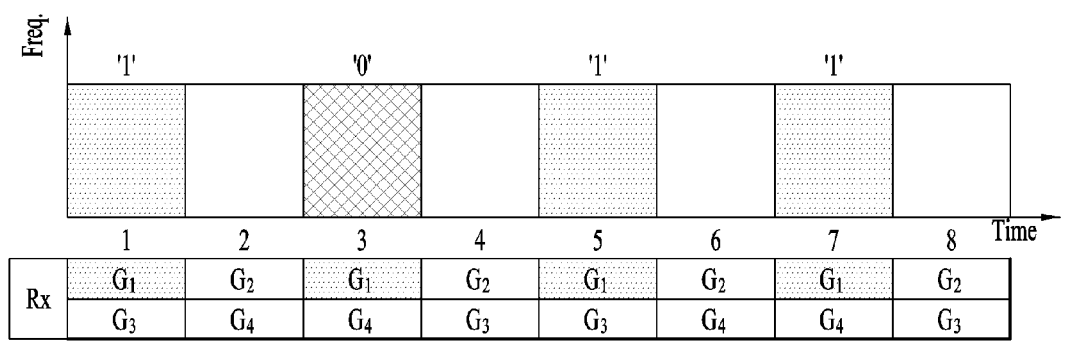
FIG. 12 exemplarily illustrates another data resource pool assigned to UE groups in accordance with the scheduling assignment resource pool and bit field indicating presence of data transmission.

For example, if the actual data transmission position, such as [1 0 1 1], is signaled through the RPT bit as shown in FIG. 10, the actual data transmission for Group $G_1$ may be arbitrarily carried out as shown in FIG. 12.

C. $R_D(l)$ Configuration Regarding Virtual $R_V(m)$-Based Data Resource Pool

In accordance with a detailed embodiment of the present invention, when the number of subframes contained in the data resource pool is set to L, the aggregate $R_V(m)$ of UE groups to be used as the Rx targets for each of M virtual subframes is calculated according to the above-mentioned scheme, and the aggregate $R_D(l)$ of UE groups to be used as the Rx targets per subframe contained in the data resource pool is determined according to the following equations.

[Equation 10]

$$R_D(l) = R_V(l \bmod M) \text{ for } l=0,1,2,\ldots,L-1$$

$$R_D(l) = R_V\left(l + N_3 \cdot \left(\left\lceil \frac{l}{M} \right\rceil - 1\right) \bmod M\right) \quad \text{[Equation 11]}$$
$$\text{for } l = 0, 1, 2, \ldots, L-1$$

If a specific D2D UE transmits data to another UE contained in the same group, SA can be transmitted according to the SA retransmission scheme based on the UE contained in another group, however, the half-duplex problem may occur in the above-mentioned data transmission. Therefore, the present invention establishes a virtual value $R_V(m)$ capable of constructing M aggregates independently from the SA resource pool so as to mitigate the half-duplex problem generated during data transmission, and the above-mentioned value $R_D(l)$ may be determined according to the above-mentioned scheme.

For example, the index aggregate for $R_V(m)$ may be denoted by the above-mentioned Table 7 according to the above-mentioned scheme. $R_V(m)$ established by Equation 10 or 11 may be replaced with $R_{SA}(m)$ as necessary.

Figure 13:
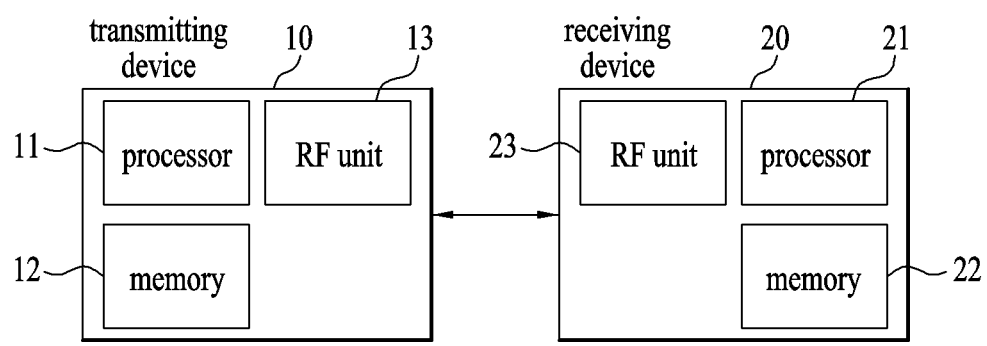
FIG. 13 is a block diagram illustrating a device for implementing embodiment(s) of the present invention.

FIG. 13 is a block diagram of a transmitting device 10 and a receiving device 20 configured to implement exemplary embodiments of the present invention. Referring to FIG. 13, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

As is apparent from the above description, the embodiments of the present invention can improve performance or throughput of a D2D communication system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing D2D (Device to Device) communication in a wireless communication system by a terminal, comprising:
obtaining information related to an SA (Scheduling Assignment) resource region comprised of at least two sub scheduling assignment (SA) resource regions for the D2D communication;
determining information regarding a terminal group to be operated in a reception mode in each sub SA resource region according to the information related to an SA resource region;
determining a terminal group to which the terminal belongs; and
receiving a scheduling assignment (SA) for the D2D communication in the sub SA resource region in which the determined terminal group is scheduled to operate in the reception mode,
wherein the information related to an SA resource region includes the number (M) of sub SA resource regions included in the SA resource region and the number ($N_R$) of sub SA resource regions to be operated in a reception mode given to one terminal group within the SA resource region.

2. The method according to claim 1, wherein the information regarding the terminal group to be operated in the reception mode within the at least two sub SA resource regions includes the number ($N_1$) of terminal groups participating in the D2D communication in the SA resource region and the number ($N_2$) of terminal groups to be operated in the reception mode in each sub SA resource region.

3. The method according to claim 1, wherein the information regarding the terminal group to be operated in the reception mode within the at least two sub SA resource regions includes the number ($N_3$) of sub SA resource regions corresponding to a minimum period in which each of all terminal groups participating in the D2D communication in the SA resource region has one sub SA resource region to be operated in the reception mode.

4. The method according to claim 1, wherein the terminal group to which the terminal belongs is determined by an index of a first subframe to which the scheduling assignment (SA) is transmitted, a random seed for terminal group decision, and an identifier (ID) of the terminal.

5. The method according to claim 1, wherein the terminal group to which the terminal belongs is changed per sub SA resource region.

6. The method according to claim 1, wherein when the terminal wishes to transmit the SA to a peer terminal which belongs to a first terminal group to which the terminal belongs, the method further includes:
changing a terminal group to which the terminal belongs from a first terminal group to a second terminal group; and
transmitting the SA to the peer terminal in a sub SA resource region in which the first terminal group is scheduled to operate in the reception mode and the second terminal group is scheduled not to operate in the reception mode, from among the SA resource regions.

7. The method according to claim 6, further comprising:
informing each terminal group of changing from the first terminal group to the second terminal group through broadcasting.

8. The method according to claim 1, further comprising:
receiving data corresponding to the received SA in a sub data resource region of a data resource region corresponding to a sub SA resource region in which the determined terminal group is scheduled to operate in a reception mode.

9. The method according to claim 8, wherein data corresponding to the SA transmitted in an n-th time resource region of the SA resource region is transmitted in a k-th time resource region of data resource region satisfying n=k mod M or $$n = k + N_3 \cdot \left( \left\lceil \frac{k}{M} \right\rceil - 1 \right) \bmod M,$$

wherein $N_3$ is the number of sub SA resource regions corresponding to a minimum period in which each of all terminal groups participating in the D2D communication in the SA resource region has one sub SA resource region to be operated in the reception mode.

10. A terminal for D2D (Device to Device) communication in a wireless communication system, comprising:
a radio frequency (RF) unit; and
a processor configured to control the RF unit,
wherein the processor obtains information related to an SA (Scheduling Assignment) resource region comprised of at least two sub scheduling assignment (SA) resource regions for the D2D communication, determines information regarding a terminal group to be operated in a reception mode in each sub SA resource region according to the information related to an SA resource region, determines a terminal group scheduled to include the terminal therein, and receives a scheduling assignment (SA) for the D2D communication in the sub SA resource region in which the determined terminal group is scheduled to operate in the reception mode,
wherein the information related to an SA resource region includes the number (M) of sub SA resource regions included in the SA resource region and the number ($N_R$) of sub SA resource regions to be operated in a reception mode given to one terminal group within the SA resource region.

* * * * *